United States Patent [19]

Kono et al.

[11] Patent Number: 5,081,407
[45] Date of Patent: Jan. 14, 1992

[54] NUMERICAL CONTROL APPARATUS

[75] Inventors: Shinichi Kono; Hironobu Takahashi, both of Oshino, Japan

[73] Assignee: Fanuc Ltd., Minamitsuru, Japan

[21] Appl. No.: 469,460

[22] PCT Filed: Aug. 28, 1989

[86] PCT No.: PCT/JP89/00873

§ 371 Date: Apr. 2, 1990

§ 102(e) Date: Apr. 2, 1990

[87] PCT Pub. No.: WO90/02367

PCT Pub. Date: Mar. 8, 1990

[30] Foreign Application Priority Data

Aug. 29, 1988 [JP] Japan ............... 63-214297

[51] Int. Cl.$^5$ ............................................. G05B 19/18
[52] U.S. Cl. ................................... 318/571; 318/569; 318/572; 318/618; 318/603; 364/474.34
[58] Field of Search ............... 318/603, 610, 612, 616, 318/618, 652, 571, 572, 569, 573; 364/474.34, 167.01

[56] References Cited

U.S. PATENT DOCUMENTS

| | | | |
|---|---|---|---|
| 4,112,291 | 9/1978 | Fukuyama et al. | 318/603 |
| 4,291,262 | 9/1981 | Nakajima | 318/571 |
| 4,374,350 | 2/1983 | Kohzai et al. | 318/616 |
| 4,398,138 | 8/1983 | Kohzai et al. | 318/603 |
| 4,501,999 | 2/1985 | Kohzai et al. | 318/572 |
| 4,680,520 | 7/1987 | Toyoda et al. | 318/594 |
| 4,782,275 | 11/1988 | Sakamoto et al. | 318/569 |
| 4,855,657 | 8/1989 | Isobe et al. | 318/603 |

FOREIGN PATENT DOCUMENTS 3310619 9/1984 Fed. Rep. of Germany.

Primary Examiner—Paul Ip
Attorney, Agent, or Firm—Staas & Halsey

[57] ABSTRACT

A numerical control apparatus according to the present invention is such that when a machine tool using a spindle motor (5) is commanded to perform a reference-point return operation and positional control of a tool or the like is carried out in response to this command, spindle reference-point return is made possible merely by applying the reference-point return command to a spindle amplifier (SPA) which drives the spindle motor (5). In accordance with the invention, a grid-shift quantity (P2) decided by the relationship between the spindle motor (5) and the object controlled thereby is set in advance on the side of the spindle amplifier (SPA) before numerical control unit (CNC) operation of the machine tool. The grid-shift quantity (P2) is added to position data (P3), which corresponds to the distance from a machine reference point to a machining starting point transferred before a fixed-position stopping command. Therefore, when the reference-point return command is outputted from the numerical control apparatus to the side of the spindle amplifier, a transition is made automatically to positional control to start movement with respect to a target position.

7 Claims, 4 Drawing Sheets $P_a$ : ARBITRARY INITIAL STOPPING POSITION $P_b$ : ONE-REVOLUTION SIGNAL DETECTION POINT $P_c$ : MACHINE REFERENCE POINT $P_d$ : MACHINING STARTING POINT (TARGET POSITION)

$P_2$ : GRID-SHIFT QUANTITY $P_3$ : NUMBER OF PULSES BETWEEN Pc AND Pd

NUMERICAL CONTROL APPARATUS

BACKGROUND OF THE INVENTION

1. Technical Field

This invention relates to a numerical control apparatus in which an operation for returning the spindle of a spindle motor to a reference point is improved. More particularly, this invention relates to a numerical control apparatus adapted in such a manner that a spindle is returned to a reference point merely by executing a single-step reference-point return command.

2. Background Art

Generally, in a numerically controlled machine tool, such as a machining center or a numerically controlled lathe, an orientation function is required for stopping a spindle at a predetermined machine reference point as when automatically changing tools. Methods of commanding return to a reference point for the purpose of implementing an orientation function of this kind include a method in which a servomotor or the like is provided separately of a spindle motor, and a method in which a spindle amplifier is provided with a spindle reference-point restoration function and a command necessary for orientation is supplied by an NC apparatus.

However, the method in which a servomotor is separately provided has economical disadvantages. Specifically, a more complicated mechanical structure cannot be avoided, and a motor for returning the spindle to the reference point must be installed. In the arrangement wherein a spindle amplifier is internally provided with a spindle reference-point return function, the signal system for commands from the NC apparatus and for reference-point setting commands is complicated, and control for positioning the spindle cannot be carried out with a single-step reference-point return command. Accordingly, in order to run the NC apparatus, the command program steps must be modified depending upon the type of machine tool to be numerically controlled.

SUMMARY OF THE INVENTION

The present invention has been devised in order to solve the foregoing problems. An important object of the present invention is to provide a numerical control apparatus in which the distance from a one-revolution signal to a machine reference point is set beforehand on the side of a spindle amplifier, and return to the reference point can be commanded in simple fashion merely by commanding the distance from the machine reference point to a stopping position.

In accordance with the present invention, there can be provided a numerical control apparatus having a function for controlling, for return to a reference point, a spindle motor capable of positionally controlling a controlled object by a position signal, comprising setting means for setting a driving amplifier of the spindle motor to a grid-shift quantity of the controlled object, command means for commanding a distance to a stopping target position during a positional control operation by a positioning control mode command, and monitoring means for monitoring the status of positional control by the spindle motor.

In the numerical control apparatus of the present invention, a grid-shift quantity decided by the relationship between the spindle motor and the controlled object is set on the side of the spindle amplifier before numerical control unit operation of a machine tool or the like, and the grid-shift quantity is added to position data, which corresponds to a machining starting point, transferred before a fixed-position stopping command. Therefore, when a reference-point return command is outputted to the side of the spindle amplifier, a transition is made automatically to positional control to start a reference-point return operation with respect to the target position so that the spindle can be positioned at the machining starting point. Accordingly, when the spindle is controlled to be positioned at a machining starting point of C-axis machining, it will suffice merely to execute a single-step reference-point return command.

DESCRIPTION OF THE PREFERRED EMBODIMENT

An embodiment of the present invention will now be described in detail with reference to the drawings.

Figure 1:
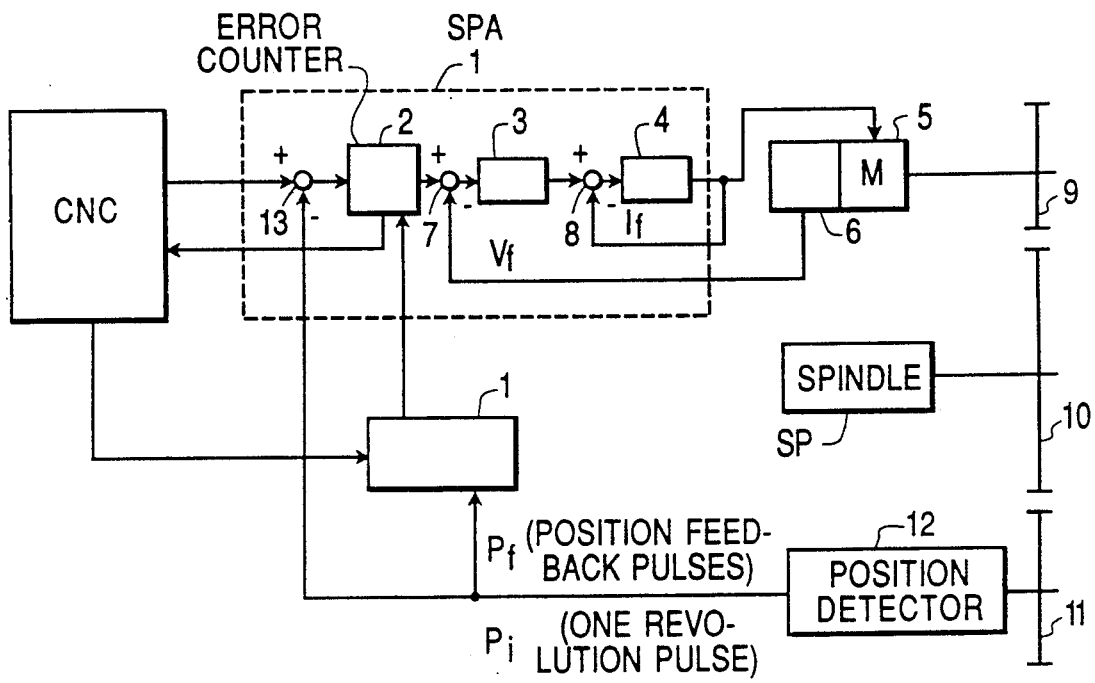
FIG. 1 is a block diagram illustrating an embodiment of the present invention.

FIG. 1 illustrates a spindle SP, which is controlled by a numerical control unit CNC, and a spindle amplifier SPA. In FIG. 1, numeral 1 denotes a spindle controller, which is constituted by a special-purpose microprocessor and memory, for outputting velocity commands and the like to the spindle amplifier SPA based on commands from the numerical control unit CNC. The spindle amplifier SPA, which is constituted by an error counter 2, a velocity amplifier 3 and a current amplifier 4, controls a spindle motor 5 to rotate the motor at the commanded velocity. The spindle motor 5 is provided with a velocity detector 6, which returns a velocity feedback signal Vf to an arithmetic unit 7. A current feedback signal If is returned to an arithmetic unit 8.

The spindle motor 5 has its torque transferred to the spindle SP via a gear mechanism 9 and drives a controlled object 11, such as a workpiece, via a gear mechanism 10. Numeral 12 denotes a position detector for detecting the control position of the controlled object 11. The position detector 12 supplies, every revolution the spindle controller 1 with position feedback pulses Pf and one-revolution pulse Pi. The position feedback pulses Pf are fed back to an arithmetic unit 13, which computes the error between these pulses and the position command which the CNC applied to the spindle amplifier SPA.

Figure 2:
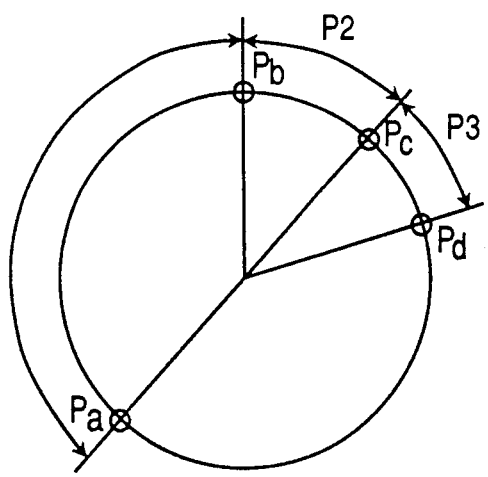
FIG. 2 is a diagram for describing an operation for returning a spindle to a reference point.

FIG. 2 is for describing operating position when the spindle is positionally controlled by using the spindle motor 5 having the construction mentioned above. In FIG. 2, the operating position of the controlled object 11 is illustrated as an angular position corresponding to detection pulses from the position detector 12. It will be assumed that the position control command from the numerical control unit CNC is outputted as a C-axis control mode command, and that the spindle has passed a one-revolution signal detection point Pb in the clockwise direction from any initial stopping position Pa. Pc represents the machine reference point set specifically for the controlled object 11. A grid-shift quantity P2 between Pb and Pc is preset internally of the spindle controller 1. Pd represents a control target position such as a machining starting point or the like for performing C-axis machining. A number P3 of pulses corresponding to the distance from the machine reference point Pc to the target position Pd is set in the error counter 2 at a predetermined timing by the CNC.

Figure 3:
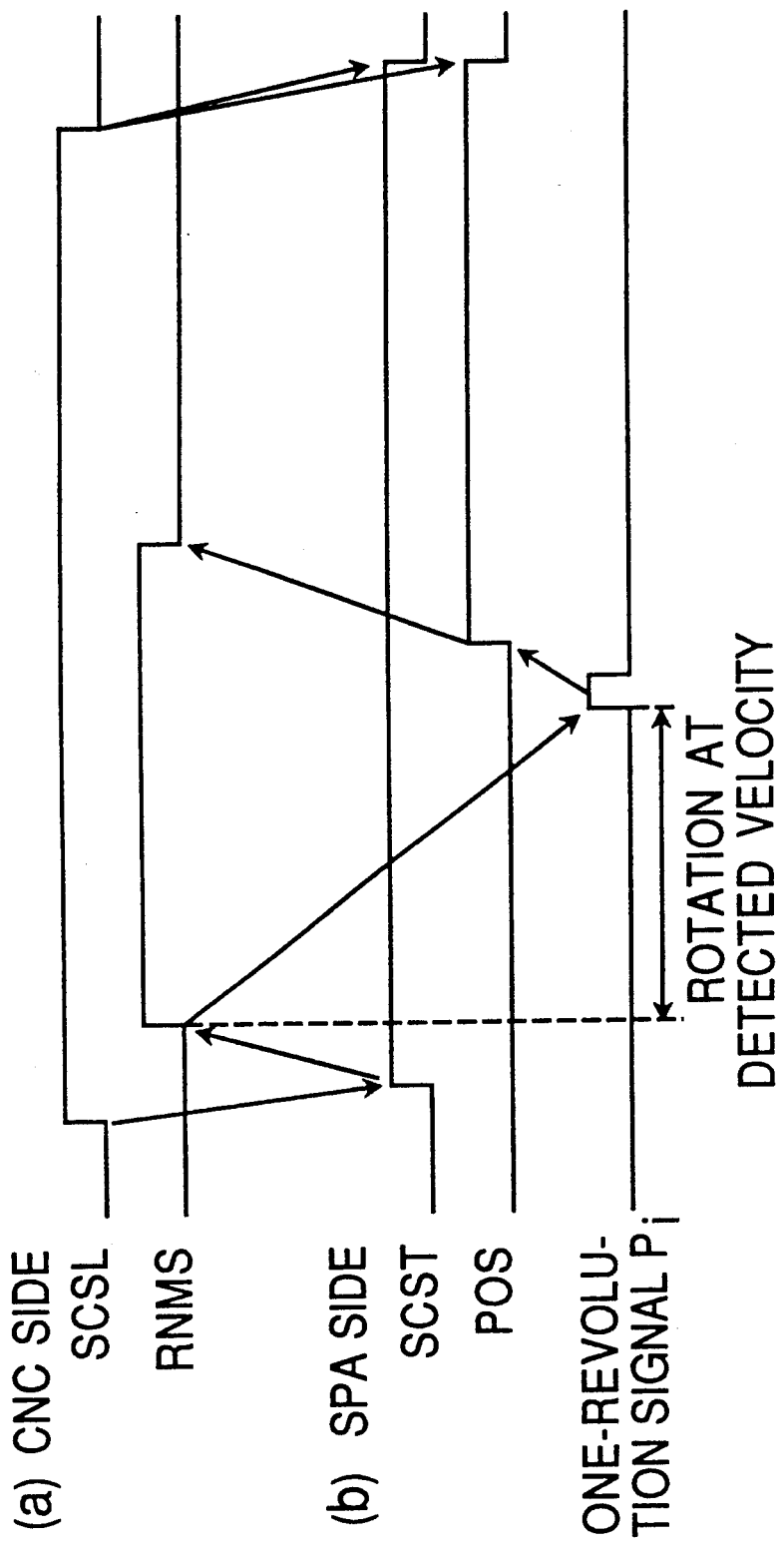
FIG. 3 is a timing chart illustrating the procedure of the reference-point return operation.
Figure 4:
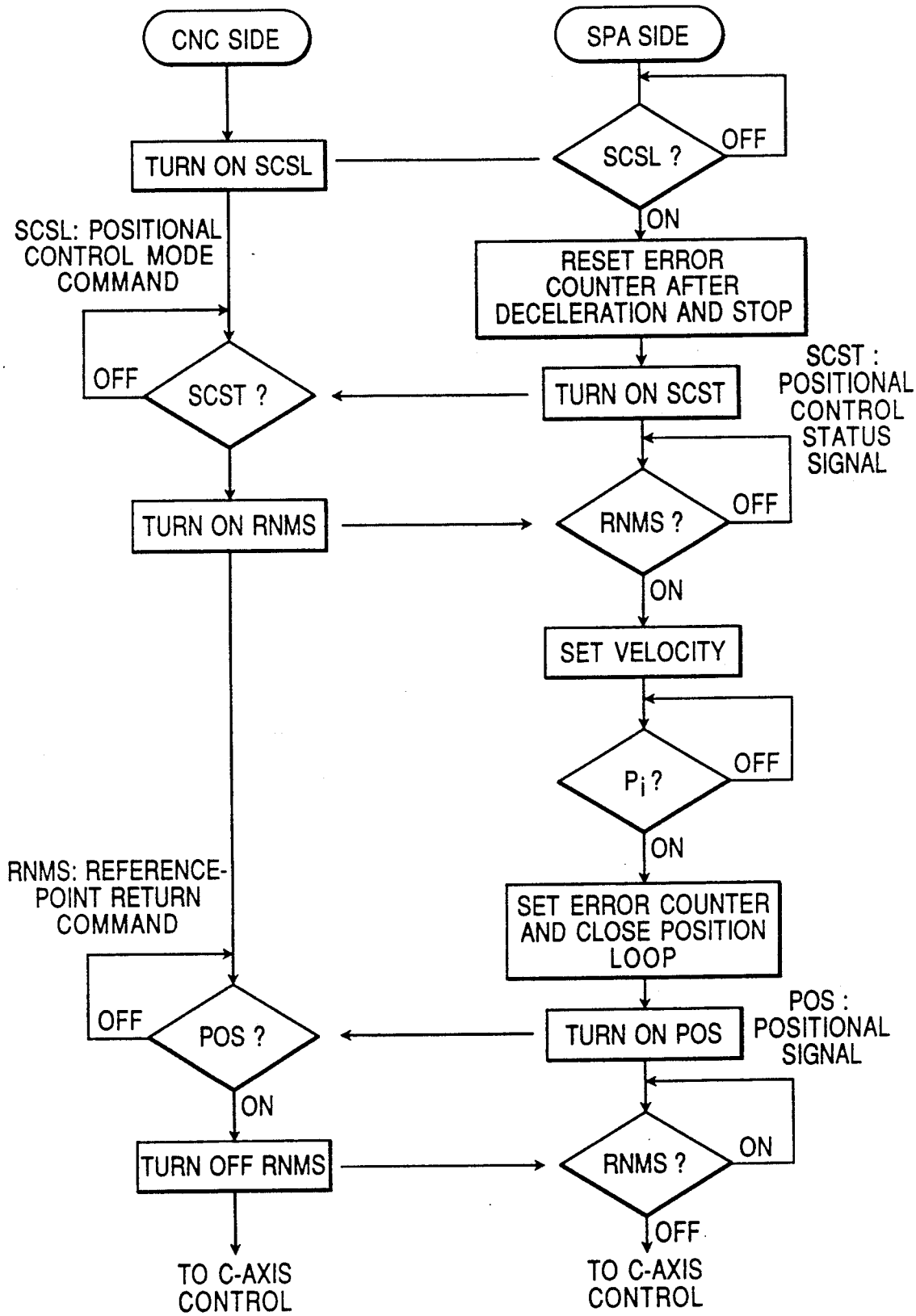
FIG. 4 is a flowchart illustrating the procedure of the reference-point return operation of the same embodiment.

FIG. 3 is a diagram showing the timing of signals exchanged by the CNC and the numerical control unit spindle amplifier SPA, and FIG. 4 is a flowchart describing the procedure of the reference-point return operation.

The operation of illustrated in the embodiment of FIG. 1 will now be described with reference to the timing diagram of FIG. 3 and the flowchart of FIG. 4 showing the processing of signals within the numerical control unit CNC and the spindle amplifier SPA. First, a positional control mode command SCSL is turned on in the numerical control unit CNC, and the numerical control unit CNC outputs the command to the spindle side. As a result, on the spindle amplifier SPA side which until now has been undergoing ordinary spindle-velocity control, the spindle motor 5 is decelerated and the spindle SP is stopped at the arbitrary initial stopping position Pa. Thereafter, the error counter 2 is reset and waits in standby until a reference-point return command RNMS is turned on. Meanwhile, data H set in a move command register, internal to the spindle controller 1, is ignored by the numerical control unit CNC.

On the side of the spindle amplifier SPA thus placed in a state capable of positional control, a positional control status signal SCST is turned on. The reference-point return command RNMS is turned on, on the side of the numerical control unit CNC, which detects the fact that the signal SCST has turned on. In response to the reference-point return command RNMS, the numerical control unit CNC rotates the spindle at the commanded velocity, which is that at which the one-revolution signal Pi can be detected, namely the detection velocity. When the one-revolution signal Pi is detected, a commanded position P (=P2+P3) is set in the error counter 2 and a position loop, which includes the position detector 12, is closed. Owing to formation of the position loop on the spindle side, a position signal POS is transferred to the numerical control unit CNC side, which is thus informed of the fact that the spindle amplifier SPA has made the transition to position control. In response, the numerical control unit CNC cancels the reference-point command RNMS and renders the move command effective. In other words, the data delivered by the numerical control unit CNC to the move command region on the spindle side indicates a number P3 of pulses corresponding to the distance from the machine reference point Pc to the commanded stopping position Pd only if the reference-point return command RNMS is on. Thereafter, a transition is made to C-axis control signal processing within the numerical control unit CNC and the spindle amplifier SPA.

Figure 5:
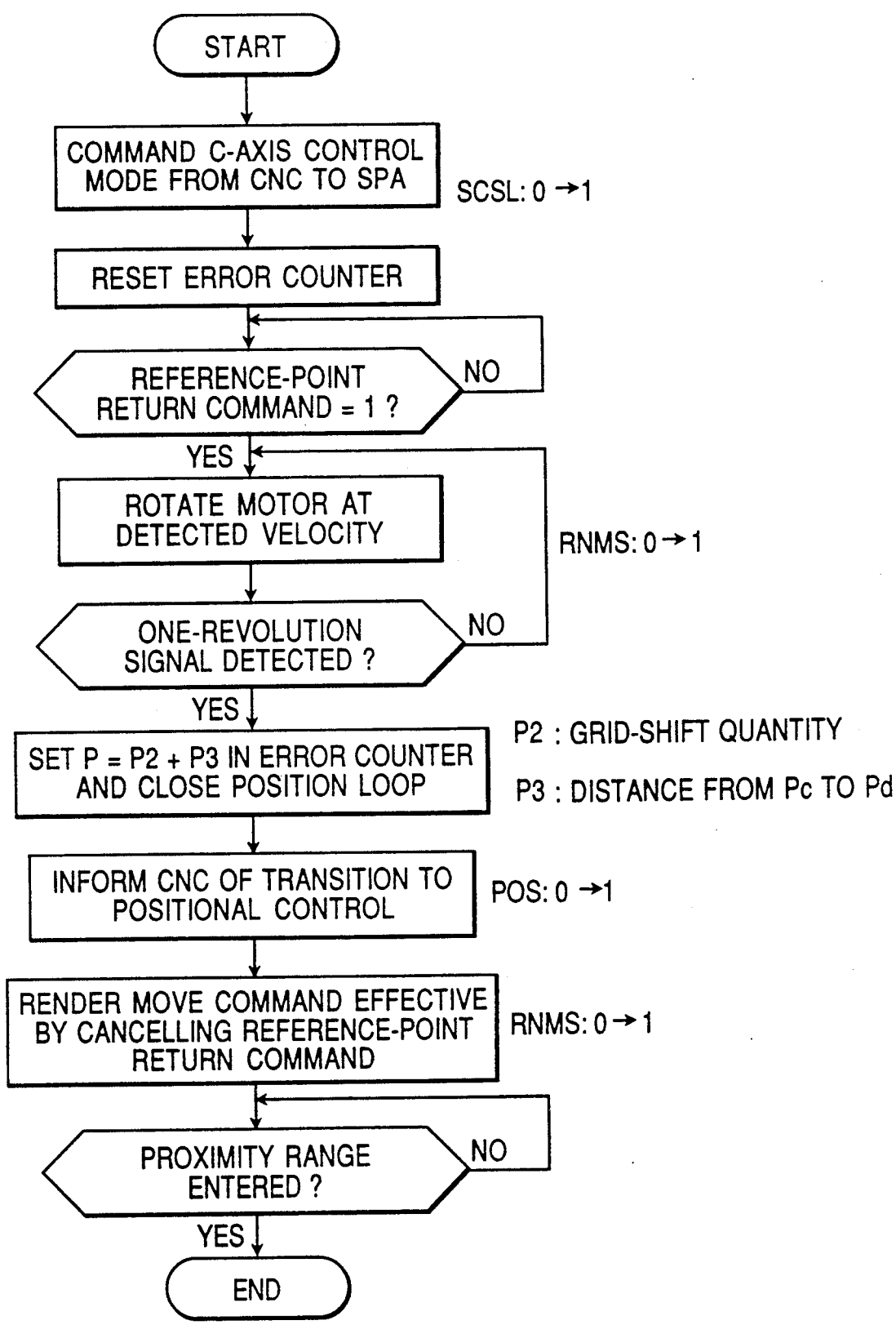
FIG. 5 is a flowchart illustrating the flow of C-axis control.

FIG. 5 is a flowchart of describing C-axis control summarizing the control flow of FIG. 4 set forth above.

Though an embodiment of the present invention has been described, the invention is not limited to this embodiment but can be modified in various ways without departing from the true spirit and scope of the claims.

The numerical control apparatus of the present invention is such that when the spindle motor 5 is controlled to perform C-axis control, the outputted reference-point return command RNMS can be responded to quickly, whereby the exchange of signals is simplified. As a result, the burden on the numerical control unit CNC side is reduced and highly precise control becomes possible.

We claim:

1. An apparatus for controlling a spindle motor to move to a machine reference position, said apparatus comprising:
    position detection means for generating a position feedback signal indicative of the position of the spindle motor and generating a one-revolution signal when the spindle motor is at a target position;
    numerical control means for issuing a positional control mode command to command the spindle motor to decelerate and stop at an arbitrary initial stopping position and for issuing a reference point return command after the spindle motor stops at the arbitrary initial stopping position;
    control amplifier means for controlling power to the spindle motor based on the command and the position feedback signal, said control amplifier comprising an error counter; and
    spindle control means for setting the contents of said error counter to a sum of a grid-shift quantity and a distance between the machine reference position and a target position when the one-revolution signal is generated.

2. An apparatus according to claim 1, wherein said spindle control means includes means for resetting said error counter after the spindle motor stops at the arbitrary initial stopping position.

3. A numerical control apparatus according to claim 2, wherein said numerical control means includes means for issuing the positional control mode command as a C-axis mode command for commanding C-axis machining before issuing the reference point return command to move the spindle motor to a machining starting point of C-axis machining.

4. A numerical control apparatus according to claim 1, wherein said error counter includes means for indicating an end of positional control based on a content of said error counter.

5. An apparatus according to claim 1, wherein said error counter comprises means for controlling power to the spindle motor based on counted differences between the command and the position feedback signal.

6. A method of numerical control by a numerical controller for returning a spindle motor to a machine reference position, wherein a position detector generates a position feedback signal indicative of a detected position of the spindle motor and a one-reduction signal when the spindle motor is at a target position and wherein an error counter controls the spindle motor based on a command from the numerical controller and the position feedback signal, said method comprising the steps of:
    (a) issuing a positional control mode command from the numerical controller to command the spindle motor to decelerate and stop at an arbitrary initial stopping position;
    (b) issuing a reference point return command from the numerical controller to command the spindle motor to rotate at a predetermined velocity; and (c) setting the error counter to a sum of a grid-shift quantity and a distance between the machine reference position and the target position when the one-revolution signal is generated by the position detector.

7. A method according to claim 6, further comprising the step of:
(d) resetting the error counter after the spindle motor stops in said step (a).

UNITED STATES PATENT AND TRADEMARK OFFICE
CERTIFICATE OF CORRECTION

PATENT NO. : 5,081,407

DATED : January 14, 1992

INVENTOR(S) : Kono et al.

It is certified that error appears in the above-identified patent and that said Letters Patent is hereby corrected as shown below:

Col. 3, line 13, after "the" (first occurrence), insert --numerical control unit--; after "the" (second occurrence), delete "numerical control unit";

line 17, delete "illustrated in"; change "of" (second occurrence) to --illustrated in--.

Signed and Sealed this

Twenty-fifth Day of May, 1993

Attest:

MICHAEL K. KIRK

Attesting Officer

Acting Commissioner of Patents and Trademarks